United States Patent

[11] 3,609,421

[72] Inventor Eugene F. Hildebrandt
 Ferguson, Mo.
[21] Appl. No. 39,355
[22] Filed May 21, 1970
[45] Patented Sept. 28, 1971
[73] Assignee Emerson Electric Co.
 St. Louis, Mo.

[54] CENTRIFUGAL ACTUATOR
 5 Claims, 7 Drawing Figs.
[52] U.S. Cl. .................................................. 310/68
[51] Int. Cl. ............................................... H02k 11/00
[50] Field of Search .................................... 310/68 E;
 200/80, 80 B

[56] References Cited
 UNITED STATES PATENTS
 2,041,161 5/1936 Brown et al. .................. 310/68

Primary Examiner—D. X. Sliney
Attorney—Charles E. Markham

ABSTRACT: A centrifugal starting switch actuator for AC electric motors mounted on a motor shaft for rotational movement thereon between two angularly spaced stops, there being means providing a light frictional drag between the shaft and actuator, the actuator being positively accelerated to switch actuation speed as the motor is accelerated to running speed by engagement with one of the stops and thereafter at running speed is free to drift between the angularly spaced stops against the light frictional drag as the motor shaft is accelerated and decelerated by motor torque pulses, whereby motor torque pulses which would otherwise rattle hinged actuating members are absorbed.

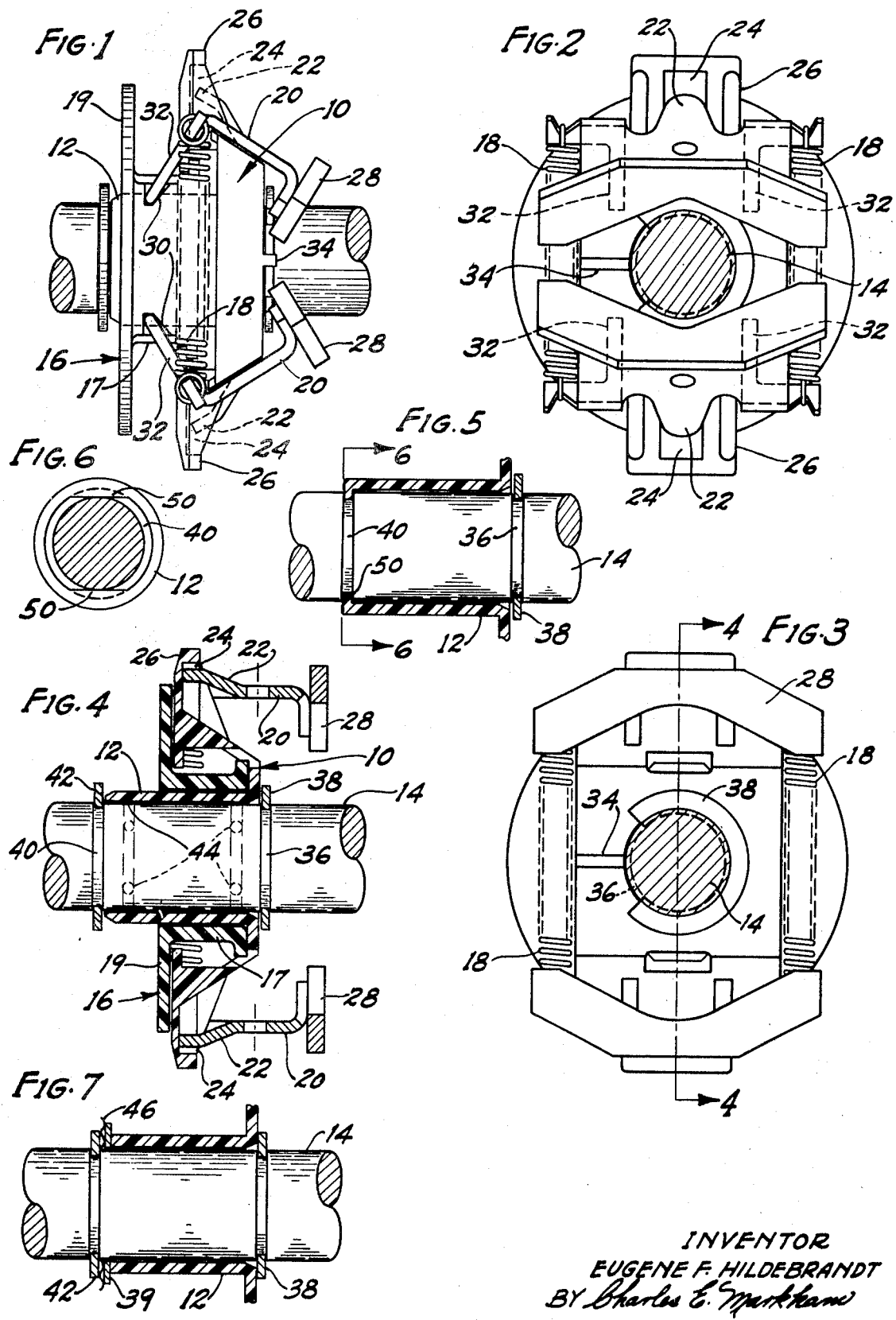

CENTRIFUGAL ACTUATOR

This invention relates to centrifugal starting switch actuators for AC electric motors and particularly to means forming a driving connection between a motor drive shaft and the actuator capable of absorbing or precluding the transmission of torque pulses from the motor shaft to the actuator.

The torque pulses in an AC electric motor, which occur twice each cycle of the AC power supply, cause the vibration of hinged parts of a centrifugal starting switch actuator and objectionable rattling noise. Various means have been proposed and employed to hold these hinged parts so that they will accelerate and decelerate with the motor shaft as it is rotated by pulsing forces. Such means have either required costly manufacturing and precise adjustment practices or they were not effective or reliable.

It is an object of this invention to provide a simple inexpensive means forming a driving connection between an AC motor shaft and a centrifugal starting switch actuator which effects a positive engagement of the motor shaft and switch actuator during acceleration of the motor to running speed, but permits limited forward rotational movement of the actuator relative to the motor shaft against a relatively light frictional drag, whereby motor torque pulses during running speed are absorbed by slipping of the actuator on the motor shaft.

In the preferred form of the invention, the centrifugal actuator is carried on a sleeve member mounted for limited rotational movement on a motor shaft against a light frictional drag. The sleeve has an axially projecting boss which alternately engages two angularly spaced stops fixed on the motor shaft as the sleeve is rotated in alternate directions on the shaft. When starting the motor in either direction, the axially projecting boss is engaged by one of the stops on the motor shaft. This engagement is substantially maintained during acceleration of the motor to its running speed, whereby the centrifugal actuator is brought to switch actuation speed and the motor starting switch is permitted to open. After a relatively constant running speed is attained, motor torque pulses, which occur at twice the nominal frequency of the AC power supply, bump the actuator forward from the driving stop on the shaft.

A full forward swing of the actuator from the driving stop to the other spaced stop on the shaft, or the repetitive bumping of the actuator by the driving stop upon the occurrence of each motor torque pulse during running speed, is precluded by the provision of a light frictional drag between the actuator sleeve and the motor shaft. This frictional drag is of such value as to permit some slipping of the actuator sleeve on the motor shaft as the shaft momentarily decelerates following a torque pulse and as it is subsequently accelerated by a succeeding torque pulse.

The construction and operation of the actuator is more fully described and illustrated in the following description and accompanying drawing, from which other objects and advantages of the invention will appear.

Referring to the drawing:

FIGS. 1 and 2 are, respectively, side and end elevational views of a centrifugal starting switch actuator constructed in accordance with the present invention and shown mounted on a motor shaft;

FIG. 3 is an end elevational view of the centrifugal actuator of Figs. 1 and 2 shown in the operational position it assumes when driven at motor running speed;

FIG. 4 is a cross-sectional view taken along line 4—4 of Fig. 3;

FIG. 5 is a fragmentary cross-sectional view of the actuator sleeve portion mounted on a motor shaft and illustrating another means for axially retaining the actuator sleeve on the motor shaft and for providing a slight frictional drag between the motor shaft and the actuator sleeve;

FIG. 6 is an end view of the actuator sleeve shown in Fig. 5 and is taken along line 6—6 of Fig. 5; and FIG. 7 is a fragmentary cross-sectional view of the actuator sleeve portion on a motor shaft, illustrating yet another means for providing a light frictional drag between the motor shaft and actuator sleeve.

Referring to the drawing in more detail, the centrifugal actuator includes a main body member generally indicated at 10, having a sleeve portion 12 mounted for rotation on a motor shaft 14. Slidably mounted on the sleeve portion 12 of the body member 10 is a switch engaging member generally indicated at 16, having a sleeve portion 17 and a large diameter circular flange 19 at one end thereof adapted to operatively engage the movable contact of a biased open motor starting switch (not shown). The switch engaging member 16 is biased axially outward from the main body member 10, that is, toward the left of Fig. 1, by a pair of springs 18 acting on a pair of opposed levers 20. The levers 20 have intermediate projections 22 which enter slots 24 formed in opposite radially outward, extending portions 26 of the body member 10. The levers 20 are pivoted about the ends of the lever projections 22.

At one end the levers 20 carry weighting elements 28 rigidly attached thereto. At their other ends, the levers 20 are bifurcated, each having a pair of end portions 32 entered into notches 30 formed in the exterior surface of the slidably mounted switch engaging member 16. The bifurcated end portions 32 of levers 20 straddle the radially outward extending portions 26 of body member 10, and at their ends, the portions 32 enter the notches 30 which are arranged at the corners of a right-angled parallelogram circumscribing the body sleeve portion 12. The switch engaging member 16 and the body member 10 are thereby caused to rotate together. Rotation of these members effects the counterclockwise rotation of levers 20, with reference to Fig. 1, about the ends of their intermediate projections 22 due to centrifugal force acting on weighting elements 28.

The counterclockwise rotation of the levers 20 causes the inward sliding movement of the switch engaging member 16 against the bias of springs 18 due to the engagement of the bifurcated end portions 32 of the levers in notches 30. Some outward shifting of the pivoting ends of projections 22 of levers 20 occurs in the radial slots 24 during this relative motion.

The body member 10 is further provided with an axially extending, integrally formed boss 34 on the right side thereof, with reference to Fig. 1. Fixed in an annular groove 36 in the motor shaft 14 and closely adjacent the right side of body member 10 is a circular washer 38 of C configuration having a gap subtending approximately 45 angular degrees, see Fig. 3. The washer 38 is positioned so that the body boss 34 lies within the gap, whereby angular movement of the body member 10 on motor shaft 14 is limited by engagement of the boss 34 with the ends of the C-washer. Mounted in an annular groove 40 in the motor shaft 14 is a snap ring 42 which prevents leftward axial movement of the body member 10 on the motor shaft. The sleeve portion 12 of body member 10 is, therefore, retained against axial movement in either direction on the motor shaft by C-washer 38 and snap ring 42.

The sleeve portion 12 of body member 10 is not completely free to oscillate on the motor shaft within the limits of the gap in C-washer 38, but is restrained by a relatively light frictional drag in the form of small buttons 44 projecting slightly from the interior surface of the sleeve portion 12 and providing a close fit of the sleeve on the shaft with limited surface contact. The body member 10, including the sleeve portion 12, is preferably formed as an integral casting of a suitable synthetic thermoplastic material.

A second means of providing a slight frictional drag between the actuator sleeve portion 12 and the motor shaft 14 is illustrated in Fig. 7. In this arrangement, a wavy spring washer 46 is positioned between the snap ring 42 and the left end of the actuator sleeve portion 12, thereby to lightly bias the right side of body member 10 against the C-washer 38 to provide a light frictional drag between these two members. A second plain washer 39 is interposed between the wavy spring washer 46 and the end of sleeve portion 12, thereby to provide surface area for engagement of the wavy spring washer.

Still another means of providing a slight frictional drag between the actuator sleeve portion 12 and motor shaft 14 is shown in Figs. 5 and 6. In this arrangement the snap ring 42 is dispensed with and the left end of the sleeve portion 12 is provided with a pair of diametrically opposed portions 50 in the form of sectors which enter the groove 40 in the motor shaft. The dimension between the parallel flat surfaces of the sectors 50 is such as to provide a slight frictional drag between the bottom of the shaft groove 40 and the actuator sleeve portion 12. The entry of the sectors 50 into the motor slot 40 also prevents axial movement of the actuator on the motor shaft. In the arrangement of Figs. 5 and 6, the body member 10, with the sleeve portion 12 and sectors 50 at the left end thereof, is preferably formed as an integral casting of a suitable synthetic plastic material, such as nylon, having sufficient resiliency to permit the deformation of the left end of sleeve portion 12 required to slip sector portions 50 over the motor shaft and snap them into the groove 40 in motor shaft 14.

OPERATION

In operation, when the motor shaft and starting switch actuator, as shown in Figs. 1 and 2, are at rest, the circular flange 19 of the switch engaging member 16 is extended to the left by the springs 18, whereby it is adapted to hold a biased open-motor starting switch (not shown) in closed position. When the motor is started, the actuator is driven by engagement of one end of C-washer 38 with the boss 34 on the body member 10. As the motor reaches running speed, centrifugal force causes the weighting elements and lever ends which carry them to move outward to the operative positions shown in FIGS. 3 and 4. In this position of the actuator the switch engaging flange 19 is retracted inward against the body member 10 and the motor starting switch is permitted to open.

When the motor has attained a relatively constant speed, the torque pulses caused by power source current reversals will cause the actuator to be bumped forward to some extent from the driving end of the C-washer 38, but not sufficiently to strike against the opposite end of the C-washer due to the frictional drag between the actuator and motor shaft.

The actuator may seek some relatively fixed position between the ends of the C-washer, in which some slipping between the motor shaft and actuator will constantly occur as the torque pulses tend to accelerate and then decelerate the actuator. The actuator may also drift slowly from one end of the C-washer to the other during relatively constant motor speed, depending upon the amount of frictional drag applied, but this will not result in any appreciable noise.

Under certain conditions, the actuator may seek an intermediate position between the ends of the C-washer, even without any frictional drag between the actuator and motor shaft. But, these conditions are critical and unpredictable so that any slight amount of frictional drag greatly improves the effectiveness of the mounting means described. Only when the frictional drag between the actuator and motor shaft becomes great enough to prevent any slipping of the actuator on the shaft due to motor pulses does the means described become ineffective. The desirable degree of frictional drag is, therefore, not critical to the extent that it is difficult to attain uniformly or maintain in production.

I claim:

1. In an AC motor having a shaft, a motor starting switch, and a centrifugal starting switch actuator mounted on the motor shaft and operative to normally hold said switch in a closed position when said motor is inoperative or operating at a low speed and to effect its opening when the motor reaches running speed; the improvement which comprises providing a mounting sleeve forming a portion of the main body of the actuator, which mounting sleeve portion is fitted on said motor shaft for rotation thereon, providing cooperating abutting surfaces on said switch actuator, and said motor shaft limiting rotational movement of said actuator on said shaft and effecting a positive driving connection between said actuator and said motor shaft when said motor is accelerating, providing means preventing axial movement of said actuator on said motor shaft, and providing means effecting a light frictional drag restraining the limited rotational movement of said actuator on said shaft.

2. The invention claimed in claim 1 in which said means effecting a light frictional drag is ineffective to prevent all angular slippage of said actuator on said shaft due to motor torque pulses when said motor is operating at running speed.

3. The invention claimed in claim 1 in which flat annular members fitted into axially spaced annular grooves in said motor shaft prevent axial movement of said actuator on said shaft, in which one of said flat annular members is a C-washer tightly fitted in one of said annular grooves, and in which an axially extending boss on said actuator extends between and abuts the ends of said C-washer to limit rotational movement of said actuator on said shaft.

4. The invention claimed in claim 1 in which two axially spaced abutment elements on said motor shaft prevent axial movement of said actuator, and in which spring means between one end of said actuator sleeve portion and one abutment element presses the other end of said sleeve portion against the other abutment, thereby providing a light frictional drag between said actuator and said motor shaft.

5. The invention claimed in claim 1 in which said motor shaft is provided with a pair of axially spaced annular grooves, in which a C-washer fitted in one of said grooves prevents axial movement of said actuator in one direction, in which a boss at one end of said actuator sleeve portion extends axially between the ends of said C-washer, thereby to limit rotational movement of said actuator on said shaft, in which circularly spaced elements carried by said sleeve portion at the other end thereof extend radially into the other of said shaft grooves and bear against the bottom thereof, whereby axial movement of said actuator in an opposite direction is prevented and whereby a light frictional drag between said actuator and said shaft is provided.